US010378255B2

(12) United States Patent
McDaid

(10) Patent No.: US 10,378,255 B2
(45) Date of Patent: Aug. 13, 2019

(54) ANIMAL CRATE LATCH

(71) Applicant: Taiwan Cable Industrial Co, Ltd., Ho Mei Town, Chang Hwa County (TW)

(72) Inventor: Cornelius McDaid, Randolph, MA (US)

(73) Assignee: Taiwan Cable Industrial Co, Ltd., Ho Mei Town (TW)

( * ) Notice: Subject to any disclaimer, the term of this patent is extended or adjusted under 35 U.S.C. 154(b) by 187 days.

(21) Appl. No.: 15/687,614

(22) Filed: Aug. 28, 2017

(65) Prior Publication Data

US 2019/0063122 A1    Feb. 28, 2019

(51) Int. Cl.
| | |
|---|---|
| *A01K 1/03* | (2006.01) |
| *E05C 3/12* | (2006.01) |
| *E05C 1/08* | (2006.01) |
| *E05C 1/00* | (2006.01) |
| *E05C 1/04* | (2006.01) |
| *A01K 1/00* | (2006.01) |

(52) U.S. Cl.
CPC ............ *E05C 1/006* (2013.01); *A01K 1/0035* (2013.01); *A01K 1/0064* (2013.01); *E05C 1/04* (2013.01); *E05Y 2900/60* (2013.01)

(58) Field of Classification Search
CPC ...... A01K 1/034; A01K 1/033; A01K 1/0245; A01K 31/08; A01K 1/03; A01K 1/0017; A01K 1/035; A01K 1/032; A01K 31/06; A01K 31/07; A01K 31/10; E06B 11/021
USPC ...... 119/481, 459, 452, 474; 49/394; 292/57
See application file for complete search history.

(56) References Cited

U.S. PATENT DOCUMENTS

| | | | |
|---|---|---|---|
| 3,556,058 A | 1/1971 | Smiler | |
| 5,101,995 A | 4/1992 | Trubiano | |
| 5,373,810 A | 12/1994 | Martin | |
| 6,003,908 A * | 12/1999 | King | .............. E05C 1/04 |
| | | | 292/61 |
| 6,230,655 B1 | 5/2001 | Cohen et al. | |
| 6,681,720 B1 * | 1/2004 | Skurdalsvold | ........... A01K 1/03 |
| | | | 119/474 |
| 6,883,463 B2 * | 4/2005 | Link | ................... A01K 1/0245 |
| | | | 119/474 |
| 9,357,748 B2 | 6/2016 | Cantwell et al. | |
| (Continued) | | | |

OTHER PUBLICATIONS

MidWest Homes for Pets, Contour Dog Crates, YouTube Video and Screen Shots, https://www.youtube.com/watch?v=vk-51JZyaus, Jul. 22, 2016.

*Primary Examiner* — Yvonne R Abbott-Lewis
(74) *Attorney, Agent, or Firm* — Altman & Martin; Steven K Martin

(57) ABSTRACT

A pet crate door latch with a vertically-reciprocating slider on the door and fixed tabs attached to a crate side panel adjacent to the door opening and forming open slots parallel to the panel. The slots can be vertical, inwardly-facing horizontal, or outwardly-facing horizontal. The slider has perpendicular or parallel edges that operate as slot edges. The perpendicular edges are slot edges for vertical slots and the parallel edges are slot edges for horizontal slots. There is a tab space below each slot edge. To engage the latch, the slider is raised until the tabs are aligned with the associated tab spaces. As the door is closing, the tabs fit through the tab spaces. When the door is closed, the slider is lowered until halted by a latch stop wherein the slot edge is transversely within the slot.

17 Claims, 15 Drawing Sheets

(56) References Cited

U.S. PATENT DOCUMENTS

| | | |
|---|---|---|
| 9,399,889 B2 | 7/2016 | Cantwell et al. |
| 9,410,348 B1* | 8/2016 | Flannery .................... E05C 1/08 |
| 9,695,636 B2 | 7/2017 | Cantwell et al. |
| 2012/0227328 A1* | 9/2012 | Link ..................... A01K 1/0017 |
| | | 49/394 |
| 2014/0109839 A1* | 4/2014 | Cantwell ................ A01K 1/034 |
| | | 119/481 |
| 2014/0216354 A1* | 8/2014 | Cantwell .............. A01K 1/0017 |
| | | 119/481 |
| 2015/0047572 A1* | 2/2015 | Rybka .................... A01K 15/02 |
| | | 119/479 |
| 2015/0084347 A1* | 3/2015 | Olsson ...................... E05C 1/08 |
| | | 292/140 |
| 2016/0014996 A1 | 1/2016 | Link et al. |
| 2016/0024824 A1 | 1/2016 | Link et al. |

\* cited by examiner

ANIMAL CRATE LATCH

STATEMENT REGARDING FEDERALLY SPONSORED RESEARCH OR DEVELOPMENT

Not Applicable

REFERENCE TO A SEQUENCE LISTING, A TABLE, OR A COMPUTER PROGRAM LISTING COMPACT DISK APPENDIX

Not Applicable

BACKGROUND OF THE INVENTION

1. Field of the Invention

The present invention relates to enclosures for animals, more particularly, to a latch for an animal crate.

2. Description of the Related Art

As a means for safely housing and training an animal in the home, animal enclosures such as crates and cages (hereinafter, "crates") are a popular choice among pet owners and animal care givers. Most crates are made from a variety of materials which include molded plastic, welded metal, mesh linked wire, and wood. Most crates utilize one or two doors with single or double latches. Some of the doors are hinged, while some slide to open.

Some door latch designs are not adequate to keep the animal contained. Also, these latches require several actions and/or two hands to operate the latch, making it cumbersome and possibly resulting in an improperly secured door.

Some latches have proven inadequate against the actions of the pet being contained, where the pet can easily manipulate the latch regardless of whether or not it has been correctly closed. While trying to escape through a partially-opened door, the animal's collar or leg can become entangled, thereby risking injury. In other cases, the door opens completely, letting the animal escape.

The need exists for an animal crate latch that can be properly secured by few steps, thereby making it more likely that the latch will be properly secured and not likely to be operable by the animal in the crate.

BRIEF SUMMARY OF THE INVENTION

The present invention is a door latch for a pet crate that has a side panel with opening closed by a door. The latch has a fixed component and a movable component. In a door embodiment, the fixed component is on the panel and the movable component is on the door. In a panel embodiment, the fixed component is on the door and the movable component is on the panel.

In the door embodiment, the fixed component is composed of one or more L-shaped tabs extending from the panel adjacent to the opening. Each tab has a base and a wall. The tab is attached to the panel at the base with the wall approximately parallel to the panel so that the tab forms a slot between the tab wall and the panel. The slot is either vertical with the open end up, horizontal with the open end toward the opening, or horizontal with the open end away from the opening.

The movable component is a slider that is a flat, rectangular sheet. In some configurations, one of the long sides is composed of perpendicular and parallel edges, relative to the long axis of the slider, that are arranged to provide the latching function depending on which configuration of the tab is implemented. Depending on the latch configuration, either the perpendicular edges or the parallel edges operate as slot edges that are transverse to the slot when the latch is engaged. In another configuration, the slider has perpendicular edges that operate as slot edges extending horizontally between long sides.

Optionally, the slider has an upper finger that extends perpendicularly from the upper end of the sheet. Optionally, the slider has a lower finger that extends perpendicularly from the lower end of the sheet.

The slider is attached vertically to the door such that the long side with the perpendicular edges and parallel edges is adjacent to and parallel to the edge of the door. The slider is attached by at least two vertically-aligned, U-shaped straps. The dimensions of the straps allow the slider to reciprocate vertically freely.

In a latch configuration with three vertical slots, the slider needs a slot edge for each slot and a tab space below the slot edge through which the tab will fit. For this latch configuration, the perpendicular edges of the slider operate as the slot edges.

To latch the door with this configuration, when the door is open, the slider is lifted up until the perpendicular edge is higher than the slot and the tab is aligned with the tab space. As the door is closing, the perpendicular edge moves over the slot and the tab fits through the tab space. When the door is closed, the slider is lowered until reaching the latch stop, which occurs when the perpendicular edge rests transversely on the tab base, thereby engaging the latch. When the latch is engaged and an attempt is made to open the door, the perpendicular edges will hit against the slot walls, preventing the door from opening.

To open the door, the slider is lifted until the tab is aligned with the tab space. As the door is pulled open, the perpendicular edge moves over the slot and the tab fits through the tab space.

In the latch configuration with three inward-facing horizontal slots, the slider needs a slot edge for each slot and a tab space below the slot edge through which the tab will fit. For this latch configuration, the parallel edges of the slider operate as the slot edges.

To latch the door with this configuration, when the door is open, the slider is lifted up until the parallel edge is higher than the slot and the tab is aligned with the tab space. As the door is closing, the parallel edge moves over the slot and the tab fits through the tab space. When the door is closed, the slider is lowered until it reaches the latch stop, which occurs when the upper finger rests on the upper strap. At this point, the parallel edge is located transversely in the slot, thereby engaging the latch. When the latch is engaged and an attempt is made to open the door, the parallel edges will hit against the slot walls, preventing the door from opening.

To open the door, the slider is lifted until the tab is aligned with the tab space. As the door is pulled open, the parallel edge moves over the slot and the tab fits through the tab space.

In the latch configuration with three outward-facing horizontal slots, the slider needs a slot edge for each slot and a tab space below the slot edge through which the tab will fit. For this latch configuration, the parallel edges of the slider operate as the slot edges.

To latch the door with this configuration, when the door is open, the slider is lifted up until the parallel edge is higher than the slot and the tab is aligned with the tab space. As the door is closing, the parallel edge moves over the slot and the tab fits through the tab space. When the door is closed, the slider is lowered until it reaches the latch stop, which occurs when the upper finger rests on the upper strap. At this point, the parallel edge is located transversely in the slot, thereby engaging the latch. When the latch is engaged and an attempt is made to open the door, the parallel edges will hit against the slot walls, preventing the door from opening.

To open the door, the slider is lifted until the tab is aligned with the tab space. As the door is pulled open, the parallel edge moves over the slot and the tab fits through the tab space.

In general terms, to engage the latch, the slider is raised until that the slot edges are higher than the associated tabs and the tabs are aligned with the associated tab spaces. As the door is closing, the slot edges move over the associated tabs and the tabs fits through the associated tab spaces. When the door is closed, the slider is lowered until halted by the latch stop, at which time the slot edge is within the slot in the transverse direction.

In the panel embodiment of the latch, the fixed component is composed of one or more tabs extending 90° inwardly to the opening from the edge of the door.

The movable component is a slider as described above. The slider needs a parallel edge for each tab and a tab space below the parallel edge that is at least the height of the tab.

The latch of the panel embodiment operates by lifting the slider up until the tab spaces are aligned with the tabs. As the door is closing, the tabs fit through the tab spaces. Once the door is closed, the slider is lowered and gravity causes it to drop to the latch stop, when the upper finger hits the upper strap to prevent the slider from dropping further. At this point, the tab spaces are no longer aligned with the tabs and the latch is engaged. An attempt to open the door causes the tab bases to hit against the parallel edge, thereby preventing the door from opening.

To open the door, the slider is lifted until the tabs align with the tab spaces and the door is pulled opened as the tabs fit through the tab spaces.

Objects of the present invention will become apparent in light of the following drawings and detailed description of the invention.

BRIEF DESCRIPTION OF THE DRAWINGS

For a fuller understanding of the nature and object of the present invention, reference is made to the accompanying drawings, wherein.

DETAILED DESCRIPTION OF THE INVENTION

Figure 1:
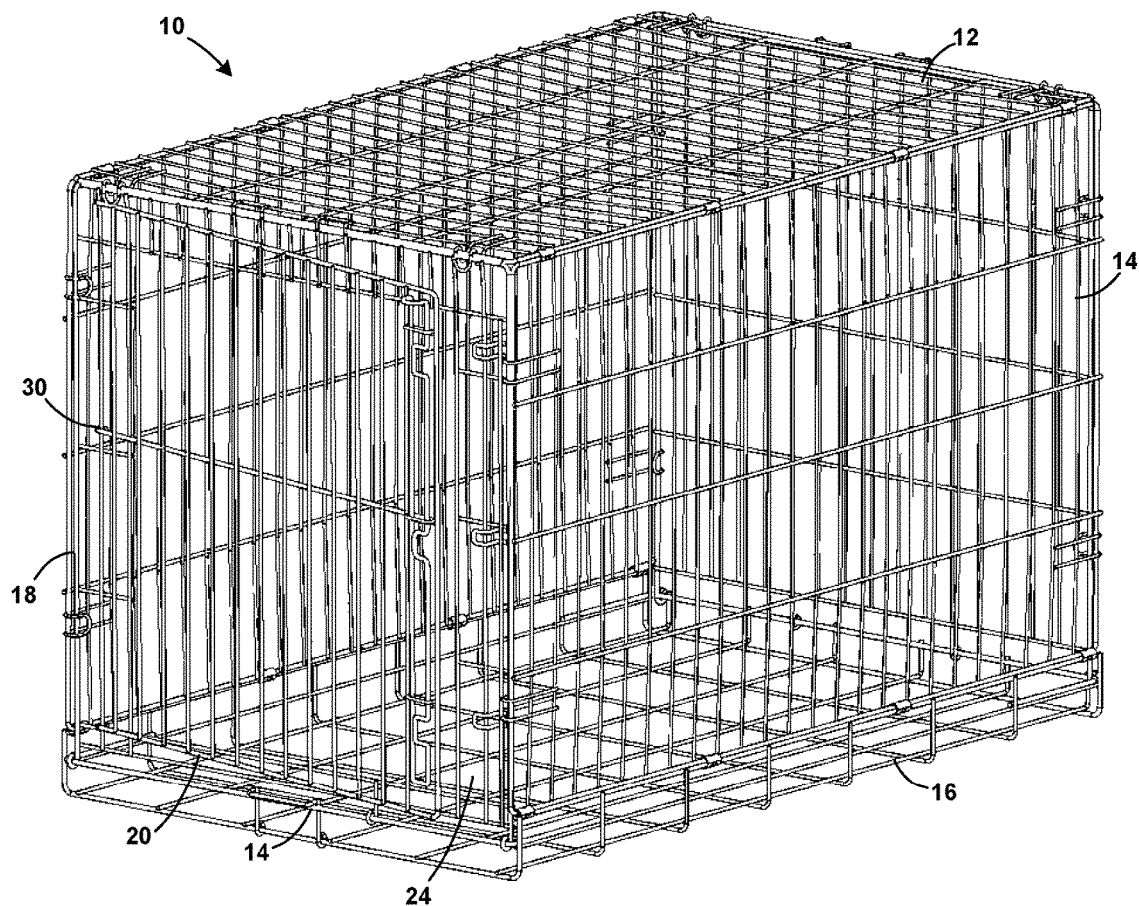
FIG. 1 is a perspective view of a typical animal crate in the open position incorporating a configuration of the door embodiment of the latch of the present invention.

A popular type of pet crate 10, shown in FIG. 1, is fabricated, at least in part, from wire rods. The top panel 12, four side panels 14, and the bottom panel 16 are composed of a plurality of vertical and horizontal wire rods 18 that are attached to each other. A pan, mat and/or cushion can be placed on the bottom panel. In some versions of the pet crate, one or more of the panels are composed of materials other than wire rods, such as solid plastic panels with or without openings. Optionally, the pet crate is collapsible, that is, it can fold into itself for storage and/or transportation.

At least one of the wire panels 14 has an opening 24 for passage to and from the interior of the crate. A door 20 composed of wire rods 40 is mounted to pivot horizontally or vertically on a hinge 30. The door 20 allows passage through the opening 24 when pivoted to an open position. The door 20 is large enough to prevent passage through the opening 24 when pivoted to a closed position. Engaging a latch 42 retains the door 20 in the closed position.

Figure 2:
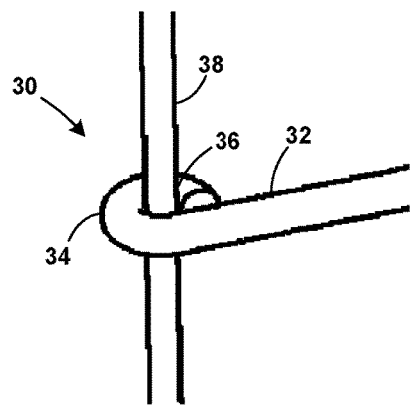
FIG. 2 is a perspective view of a typical hinge.

The hinge 30 can take any form that is appropriate or desired. The typical hinge 30, shown in FIG. 2, is formed by loosely crimping the end of an extension rod 32 extending from the perimeter 22 of the door 20 around a pivot rod 38 at the perimeter 26 of the opening 24. The crimp 34 forms an aperture 36 through which the pivot rod 38 extends and is large enough to permit the aperture 36 to pivot easily on the pivot rod 38. Alternatively, the arrangement is reversed, with the extension rod 32 extending from the opening perimeter 26 and crimped around a pivot rod on the door perimeter 22. Other hinge mechanisms are known in the art and can be used with the present invention.

The present invention is a latch 42 that can be used in any orientation, for example, vertical or horizontal. Because of the advantage provided by gravity, as explained below, the preferred orientation is generally vertical. Unless specified otherwise, the remainder of the present specification assumes a vertical orientation.

The latch 42 of the present invention has a fixed component 44 and a movable component 46. In the door embodiment, the fixed component 44 is on the panel 14 and the movable component 46 is on the door 20. In the panel embodiment, the fixed component 44 is on the door 20 and the movable component 46 is on the panel 14.

In the door embodiment, the fixed component 44 is composed of one or more L-shaped tabs 50 extending from the panel 14 adjacent to the opening 24. Each tab 50 has a base 53 with a length 55 and a wall 52 with a length 54.

Figure 3:
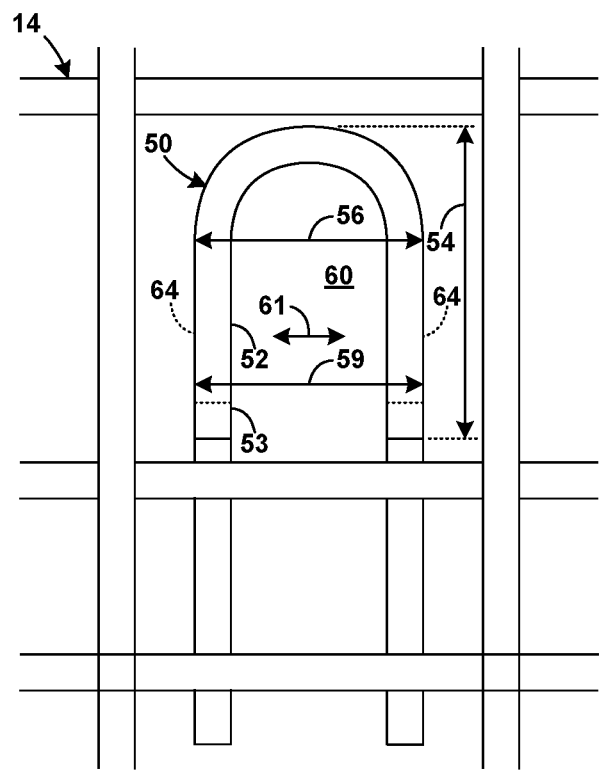
FIG. 3 is a front view of the tab/slot parameters.
Figure 4:
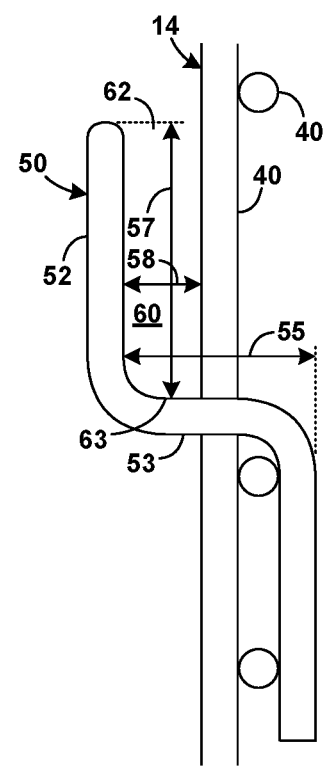
FIG. 4 is a side view of the tab/slot parameters.

As shown in FIGS. 3 and 4, the tab 50 is attached to the panel 14 at the base 53 with the wall 52 approximately parallel to the panel 14 so that the tab 50 forms a slot 60 between the tab wall 52 and the panel 14. The slot 60 has a length 57, a depth 58, and a width 59. The slot 60 has an open end 62 and open sides 64. The tab base 53 is the closed end 63 of the slot 60. The slot 60 has a transverse direction 61, which extends across the open sides 64.

Figure 5:
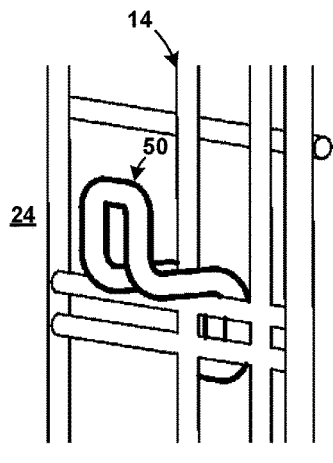
FIG. 5 shows how the tab is attached to the panel vertically.
Figure 6:
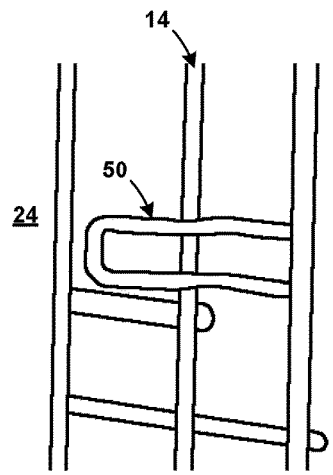
FIG. 6 shows how the tab is attached to the panel horizontally with the finger pointing toward the opening.
Figure 7:
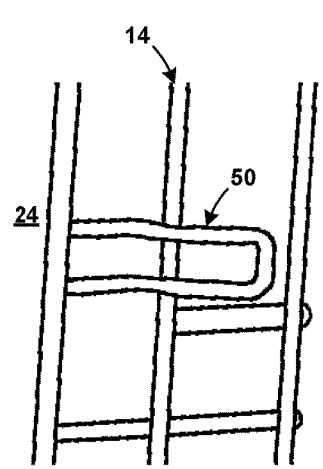
FIG. 7 shows how the tab is attached to the panel horizontally with the finger pointing away from the opening.

The slot 60 is either vertical with the open end 62 up, as in FIG. 5, horizontal with the open end 62 toward the opening 24, as in FIG. 6, or horizontal with the open end 62 away from the opening 24, as in FIG. 7.

Figure 8:
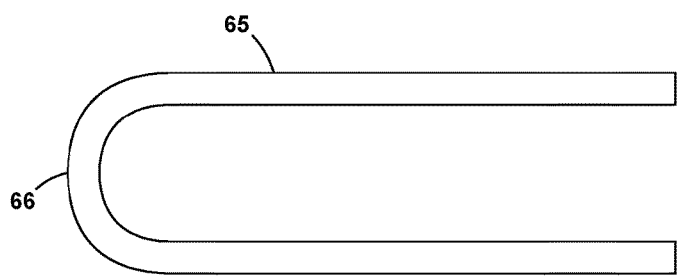
FIG. 8 is an elevational view showing the first step in forming a tab for the door embodiment.
Figure 9:
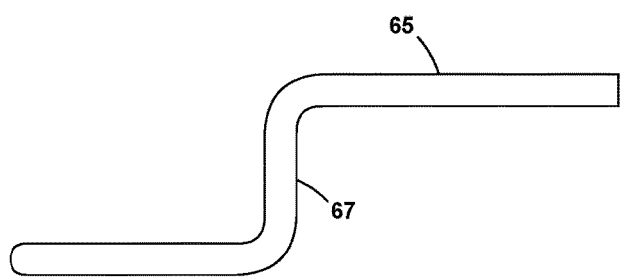
FIG. 9 is a side view showing the second step in forming a tab for the door embodiment.

The tab 50 can be formed from any material and in any manner that forms a slot 60 as described above. In one, the tab 50 is formed by first bending a section of wire rod 65 into a U shape, as at 66 in FIG. 8. It is then bent approximately 90° perpendicularly to the plane of the U bend 66, and again at approximately 90° in the other direction, into a general S shape, as at 67 in FIG. 9. Alternatively, the section of rod 52 can be the ends of two parallel rods of the panel 14.

Alternatively, the tab 50 can be formed from materials other than a wire rod. For example, the tab 50 can be composed of a rigid plastic or carbon composite that is cut, stamped, or injected molded. In another example, the tab 50 can be composed of a metal that is cut or stamped and then bent, or cast.

Typically, the wire rod tab 50 will be welded to the panel rods 18, but any method of attachment that securely affixes the tab 50 to the panel 14 can be employed. Tabs 50 composed of other materials (plastic, metal, etc.) can be attached by whatever means is appropriate. For example, the tab 50 can be attached by a bracket or clamp.

The movable component 46 is a slider 70 that is a substantially flat, rectangular sheet 72 with a longitudinal direction 74, a width 76, and a thickness 78. As shown in examples of the slider 70 in FIGS. 11-17, one of the long sides 80 that extends the longitudinal direction 74 of the slider is composed of perpendicular edges 82 and parallel edges 84 that are arranged to provide the latching function depending on which configuration of the tab 50 is implemented. The perpendicular edges 82 are substantially perpendicular to the longitudinal direction 74 of the slider 70 and the parallel edges 84 are substantially parallel to the longitudinal direction 74 of the slider 70. Depending on the latch configuration, either the perpendicular edges 82 or the parallel edges 84 operate as slot edges 90. A slot edge 90 is an edge that is transverse to the slot 60, that is, it extends across the slot 60 in the transverse direction 61, when the latch 42 is engaged.

Figure 18:
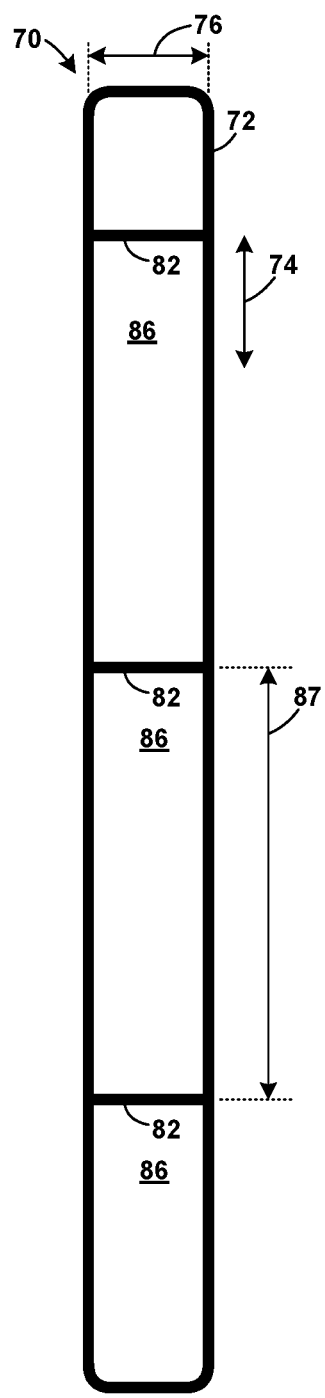
FIG. 18 is a front view of another configuration of a wire rod slider.

Another configuration of the slider 70 is shown in FIG. 18. The slider 70 is a substantially flat, rectangular sheet 72 with a longitudinal direction 74, a width 76, and a thickness 78. Perpendicular edges 82 that operate as slot edges 90 extend between the long sides of the sheet 72 and are substantially perpendicular to the longitudinal direction 74.

The configurations of the slider 70 shown in FIGS. 11-18 and other possible configurations are discussed below.

Figure 12:
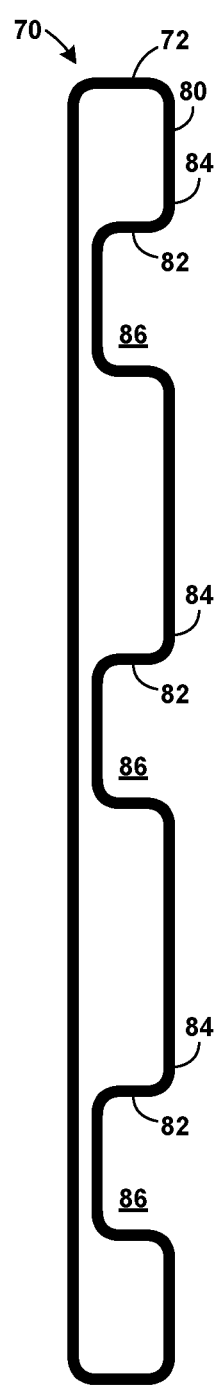
FIG. 12 is a front view of the slider configuration of FIG. 11 composed of a bent wire rod.
Figure 13:
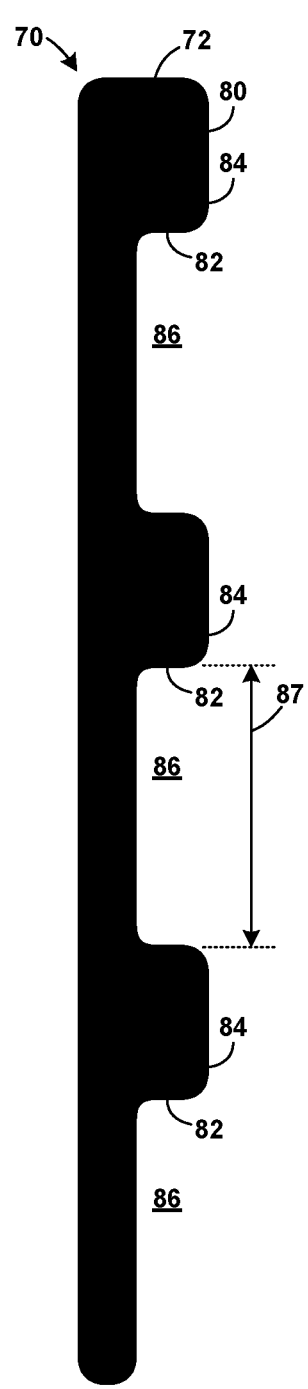
FIG. 13 is a front view of another configuration of the slider.
Figure 14:
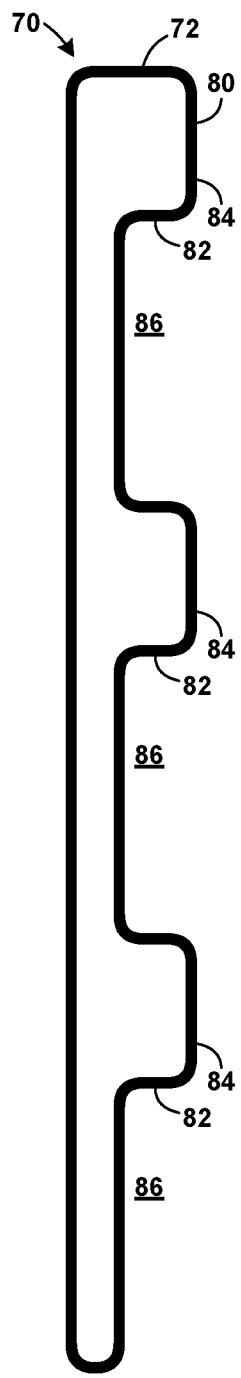
FIG. 14 is a front view of the slider configuration of FIG. 13 composed of a bent wire rod.

In the present design, the slider 70 is composed of a wire rod bent into the outline of the sheet 72, as in the example of FIG. 12. Typically, the two ends of the wire rod will be welded together. In the configuration of FIG. 18, the wire rods that form the perpendicular edges 82 will typically be welded to the long sides.

The present invention contemplates that the slider 70 can be composed of materials other than a wire rod. For example, the slider 70 can be composed of a rigid plastic or carbon composite that is cut, stamped, or injected molded, as in FIG. 11. In another example, the slider 70 can be composed of a metal that is cut, stamped, or cast. In another example, the slider 70 can be composed of wood.

Figure 19:
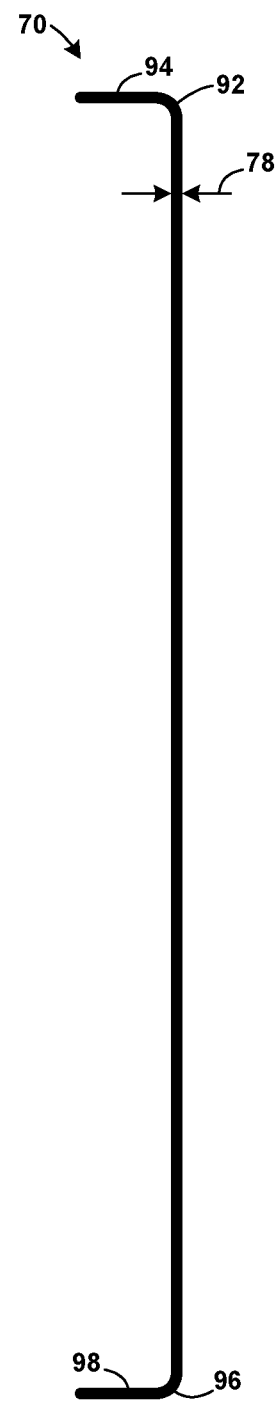
FIG. 19 is a side view of all configurations of the slider with upper and lower stops.

Optionally, as shown in FIG. 19 and explained below, the slider 70 has an upper finger 94. The upper finger 94 extends approximately horizontally from the upper end of the sheet 72 away from the plane of the sheet 72, as at 92. For the wire slider 70, the upper finger 94 is formed by bending the upper end of the sheet 72 approximately 90°.

Optionally, as shown in FIG. 19 and explained below, the slider 70 has a lower finger 98. The lower finger 98 extends approximately horizontally from the lower end of the sheet 72 away from the plane of the sheet 72, as at 96. For the wire slider 70, the lower finger 98 is formed by bending the lower end of the sheet 72 approximately 90°.

The slider 70 is attached vertically to the door 20 such that the long side 80 with the perpendicular edges 82 and parallel edges 84 is adjacent to and parallel to the edge 28 of the door 20 opposite the hinges 30. Typically, the slider 70 will be attached such at it does not overhang the edge 28 of the door 20. Typically, the slider 70 will be attached such that it is between the vertical rod 40A at the edge 28 of the door 20 and the vertical rod 40B adjacent to the edge of the door 20, as in FIG. 10.

The slider 70 is attached by at least two straps 100, 102. The straps 100, 102 are U-shaped brackets with a width 104 that is slightly larger than the sheet width 76 and a depth 106 that is slightly larger than the sheet thickness 78. Typically, the straps 100, 102 are composed of wire rods that are bent to the desired U shape. Alternatively, the straps 100, 102 are composed of bent metal strips, molded plastics, cast metals, or any other appropriate materials.

The straps 100, 102 are vertically aligned and securely attached to the door rods 40 by welding or other method that is appropriate for the strap material. Alternatively, the straps 100, 102 are bent sections of the horizontal panel wire rods 18 so that no separate straps are necessary. The location of the straps 100, 102 on the slider 70 depends on the configuration of the slider 70 and tabs 50.

The dimensions of the straps 100,102 allow the slider 70 to reciprocate vertically freely, while preventing the slider 70 from substantial horizontal motion, thereby maintaining the slider 70 in the proper position on the door 20.

As described above, there are three contemplated orientations of the slot 60, one vertical and two horizontal. Each orientation will be discussed with various configurations of the slider 70.

Figure 10:
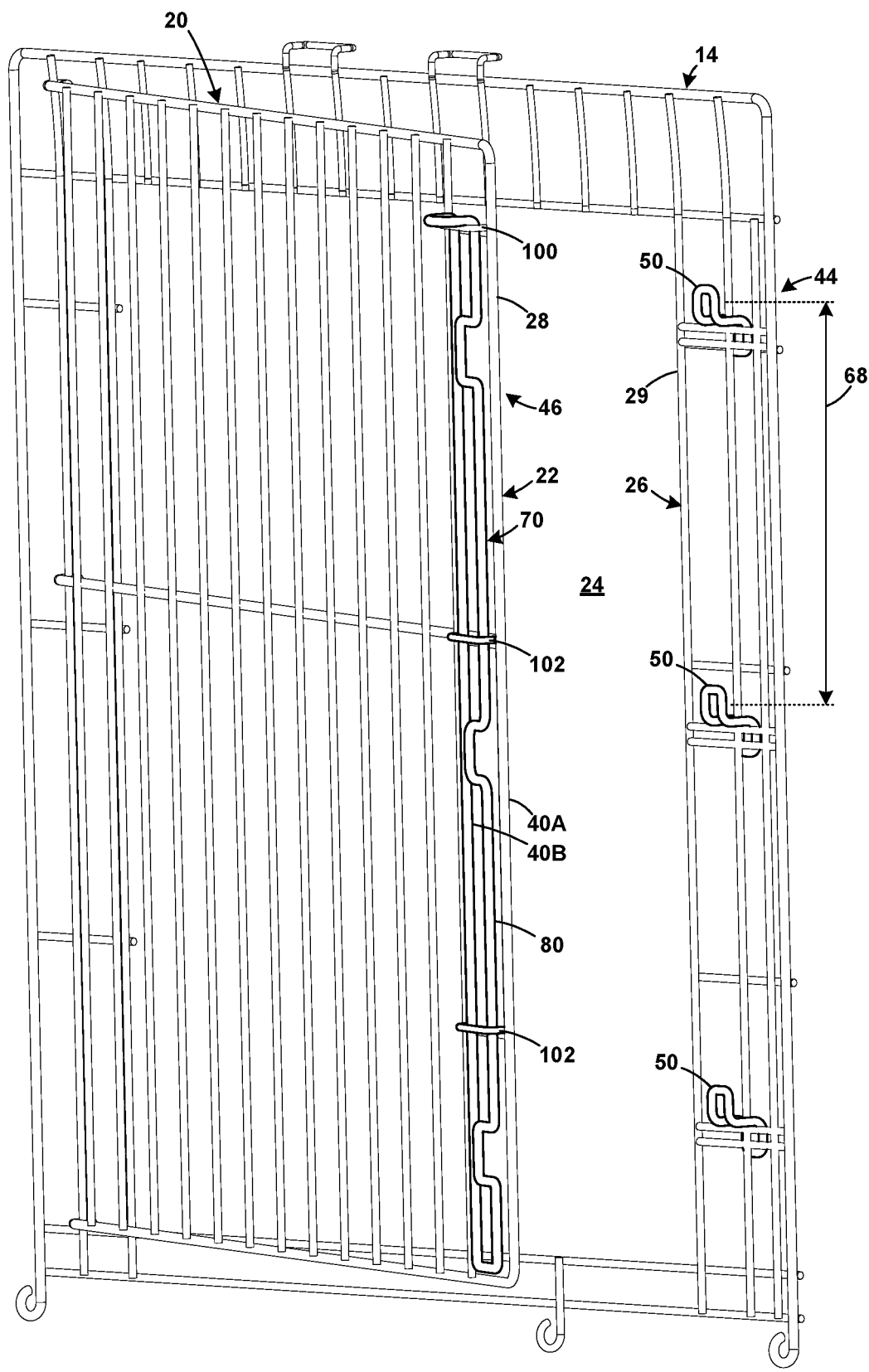
FIG. 10 is a perspective view of a side of the crate showing a first configuration of the door embodiment with vertical slots.

A latch configuration with three vertical slots 60 is shown in FIG. 10 and various configurations of the slider 70 that will operate with the vertical slots 60 are shown in FIGS. 11-18. The slider 70 needs a slot edge 90 for each slot 60 and a tab space 86 below the slot edge 90 with a height 87 that is at least the length 54 of the tab wall 52, as explained below. For this latch configuration, the perpendicular edges 82 of the slider 70 operate as the slot edges 90. The spacing 89 between perpendicular edges 82 is the same as the spacing 68 between the centers of the tabs 50.

Each of the configurations of the slider 70 of FIGS. 11-18 has a perpendicular edge 82 that operates as a slot edge 90 and a tab space 86 below the perpendicular edge 82 with a height 87 that is at least the tab wall length 54.

Figure 15:
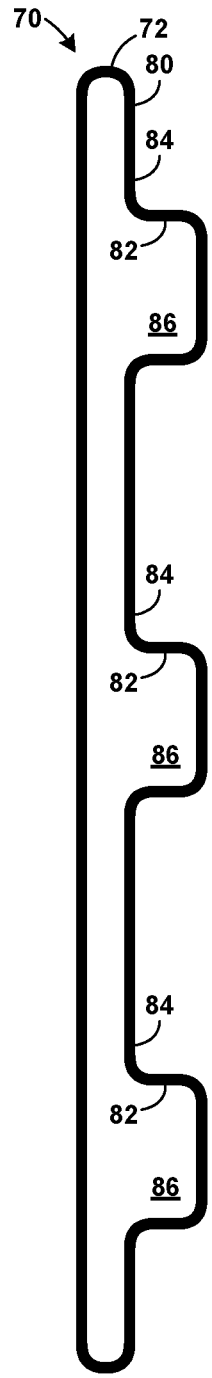
FIG. 15 is a front view of another configuration of a bent wire rod slider.
Figure 16:
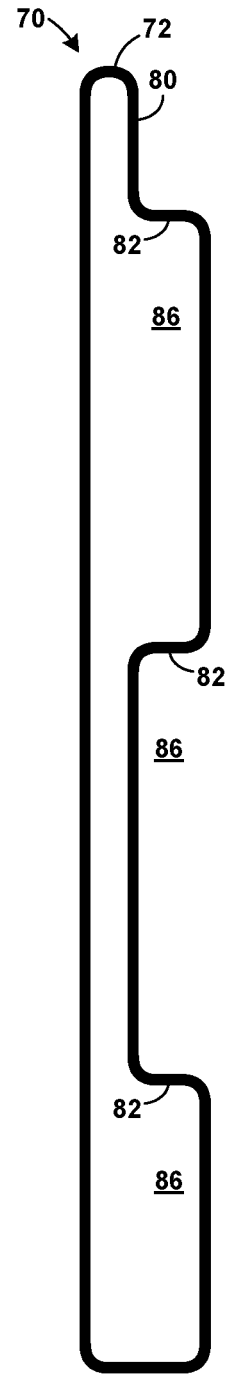
FIG. 16 is a front view of another configuration of a bent wire rod slider.
Figure 17:
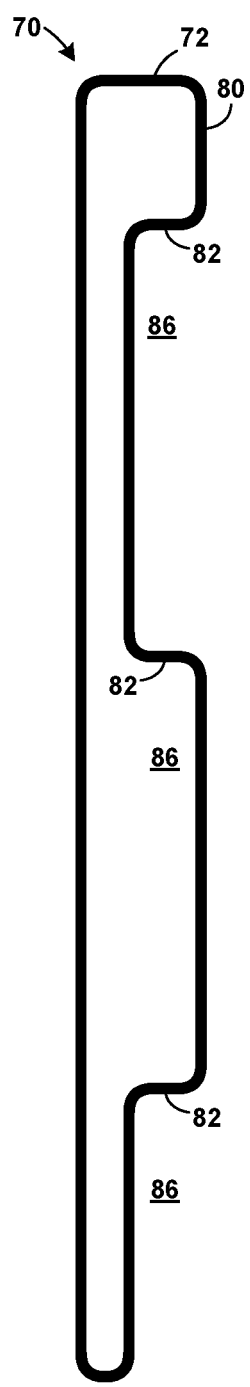
FIG. 17 is a front view of another configuration of a bent wire rod slider.
Figure 20:
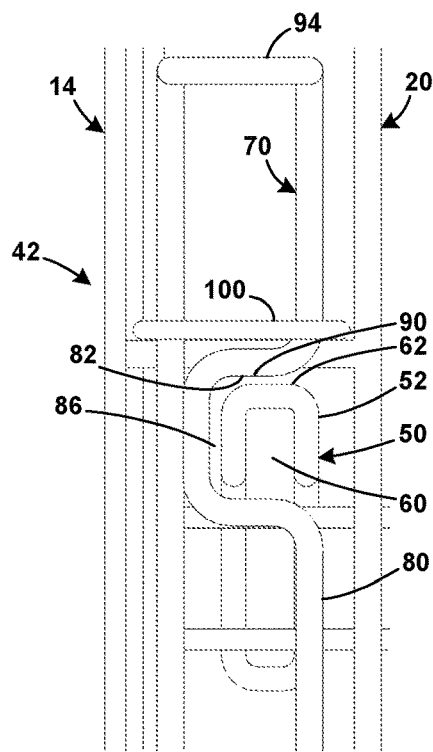
FIG. 20 is a detailed view of the configuration of FIG. 10 with the slider of FIG. 12 in the unlatched position.
Figure 21:
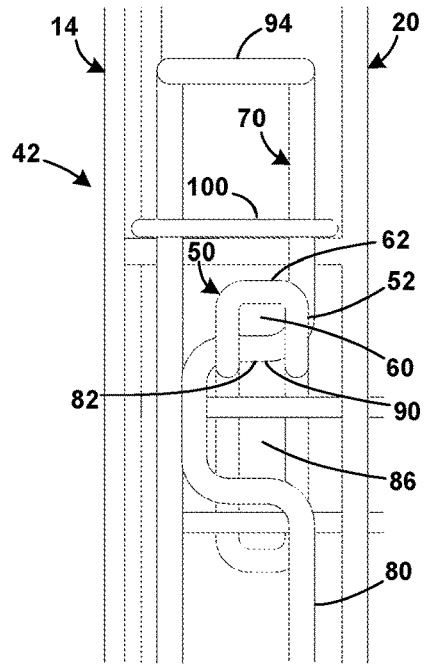
FIG. 21 is a detailed view of the configuration of FIG. 10 with the slider of FIG. 12 in the latched position.
Figure 24:
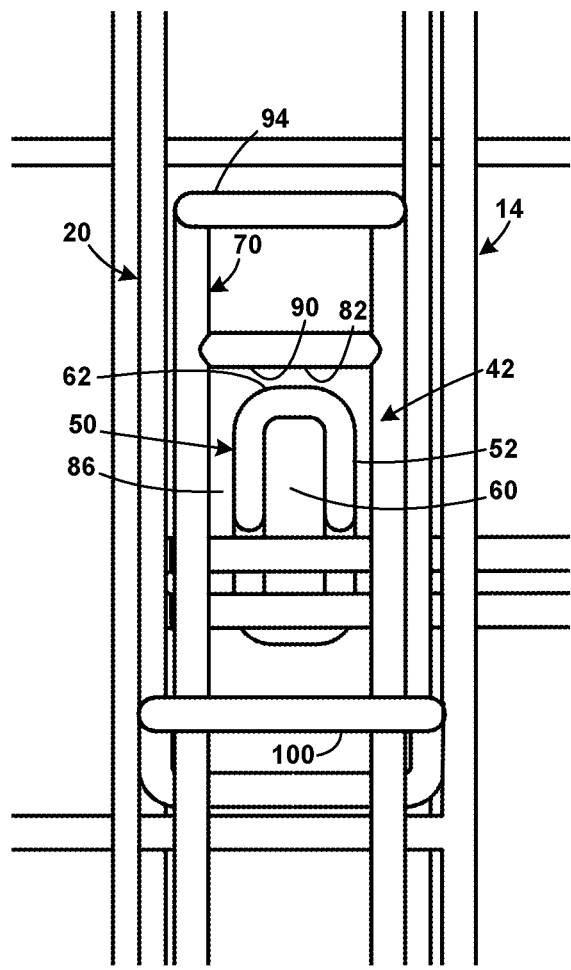
FIG. 24 is a detailed view of the configuration of FIG. 10 with the slider of FIG. 18 in the unlatched position.
Figure 25:
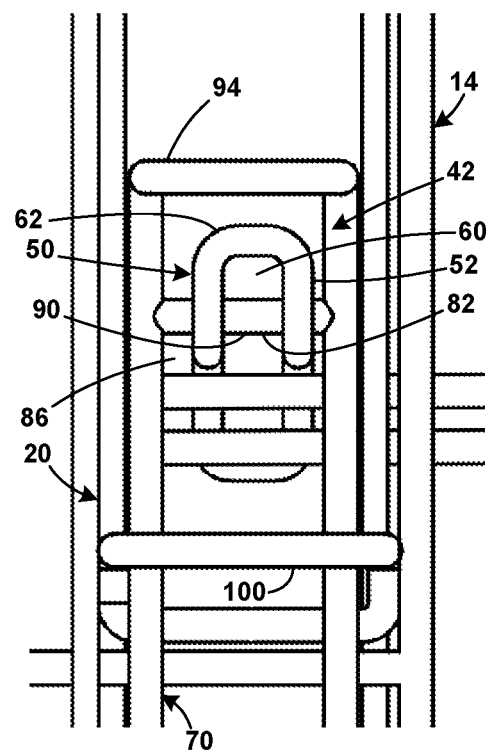
FIG. 25 is a detailed view of the configuration of FIG. 10 with the slider of FIG. 18 in the latched position.

FIGS. 20 and 21 show how that latch 42 operates with the slider 70 of FIG. 11 or 12, FIGS. 22 and 23 show how that latch 42 operates with the slider of FIG. 15, and FIGS. 24 and 25 show how that latch 42 operates with the slider of FIG. 18. With the door 20 open, the slider 70 is installed by holding it above the upper strap 100 and sliding it downwardly into the straps 100, 102. The optional upper finger 94 prevents the slider 70 from falling through the upper strap 100 when the door 20 is open.

Figure 22:
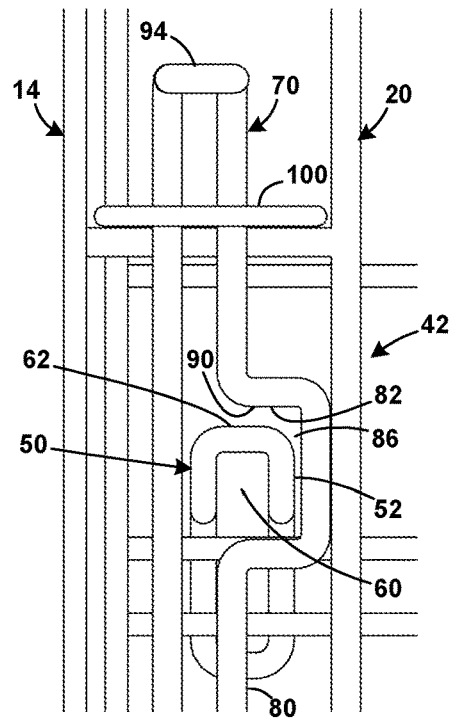
FIG. 22 is a detailed view of the configuration of FIG. 10 with the slider of FIG. 15 in the unlatched position.
Figure 23:
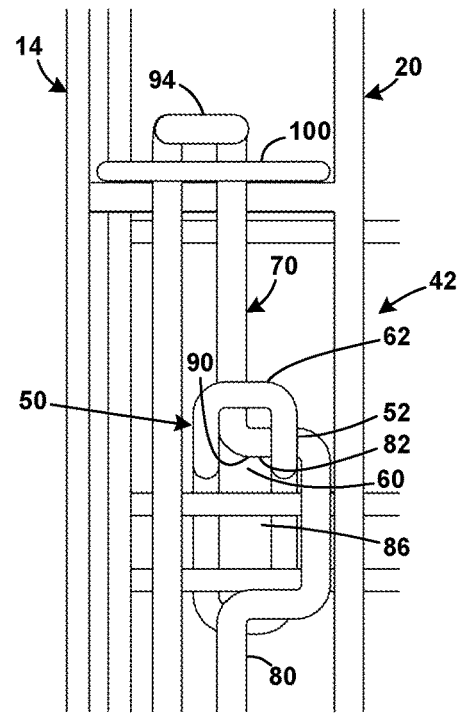
FIG. 23 is a detailed view of the configuration of FIG. 10 with the slider of FIG. 15 in the latched position.

To latch the door, when the door 20 is in the open position, the slider 70 is lifted up until the perpendicular edge 82 is higher than the slot 60, as in FIGS. 20, 22, and 24, and the tab 50 is aligned with the tab space 86 below the perpendicular edge 82. Optionally, the upper finger 94 can be made large enough to be grasped for pulling the slider 70 up.

Optionally, the optional lower finger 98 can be used to limit how far up the slider 70 can be pulled and to stop the upward motion where desired. If a strap 102 is positioned such that the lower finger 98 hits the strap 102 when the perpendicular edge 82 is just above the slot 60, the user does not have to determine by eye whether or not the tab 50 is aligned with the tab space 86 below the perpendicular edge 82.

As the door 20 is pivoted to the closed position, the perpendicular edge 82 moves over the slot 60 and the tab 50 fits through the tab space 86 below the perpendicular edge 82. In order for the perpendicular edge 82 to move over the slot 60, the height 87 of the tab space 86 below the perpendicular edge 82 must be at least the length 56 of the tab 50 so that there is no interference from the slider 70.

Further, if the perpendicular edge 82 is between the rods 40A, 40B of the door 20, the space between the rods 40A, 40B must be large enough so that the tab 50 fits through the rods 40A, 40B.

When the door 20 is in the closed position, the slider 70 is released or lowered. Gravity causes the slider 70 to drop until reaching the latch stop 91, which occurs when the perpendicular edge 82 rests transversely on the tab base 53 at the closed end 63 of the slot 60, as in FIGS. 21, 23, and 25, thereby preventing the slider 70 from dropping further and thereby engaging the latch 42, as in FIGS. 21, 23, and 25.

When the latch 42 is engaged and an attempt is made to open the door 20, the perpendicular edges 82, which are located transversely in the slots 60, will hit against the slot walls 52, thereby preventing the door 20 from opening.

In order to open the door 20, the slider 70 is lifted until the tab 50 is aligned with the tab space 86 below the perpendicular edge 82. As the door 20 is pulled open, the perpendicular edge 82 moves over the slot 60 and the tab 50 fits through the tab space 86.

Figure 26:
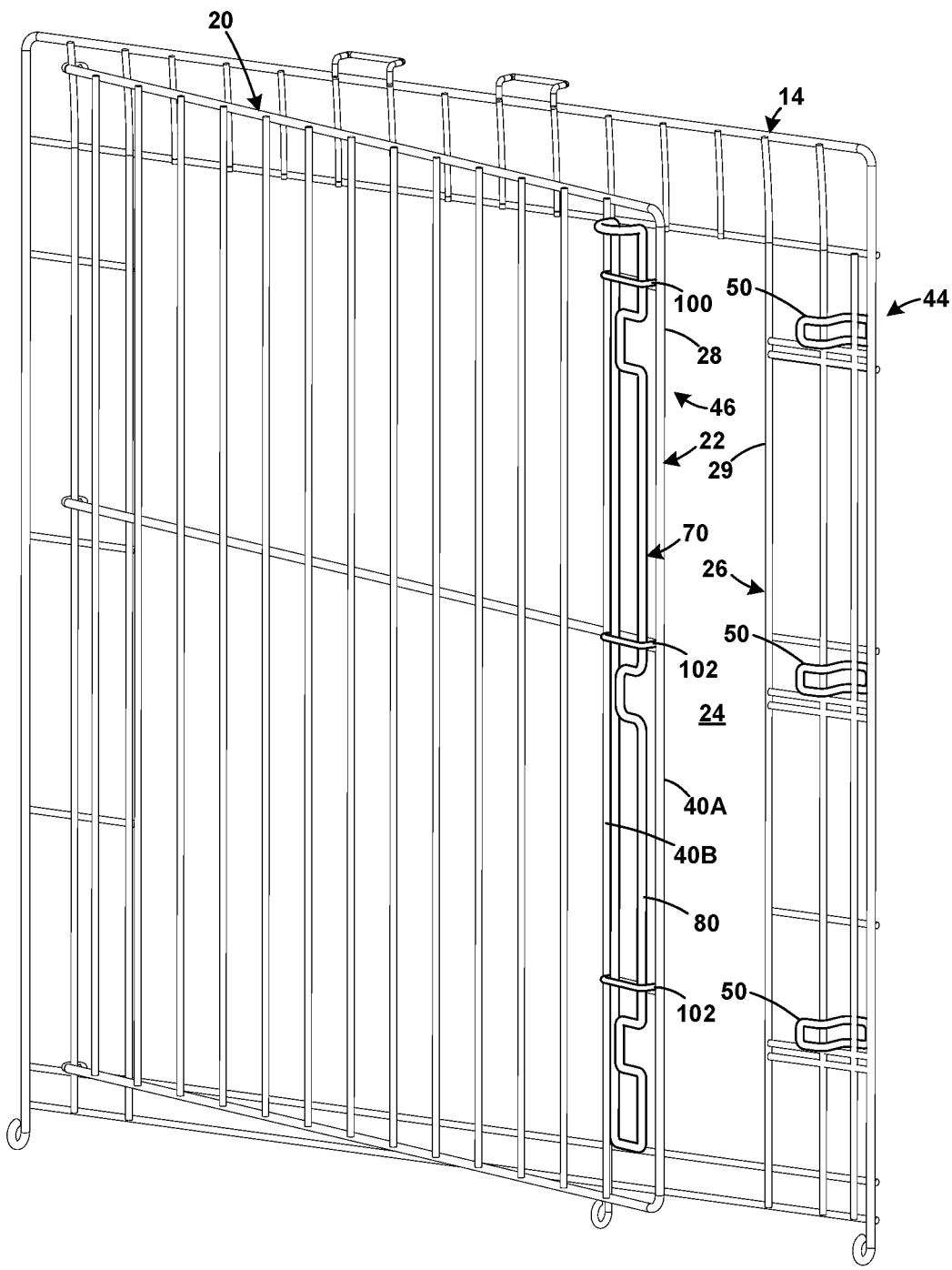
FIG. 26 is a perspective view of a side of the crate showing a configuration of the door embodiment with inward slots.
Figure 27:
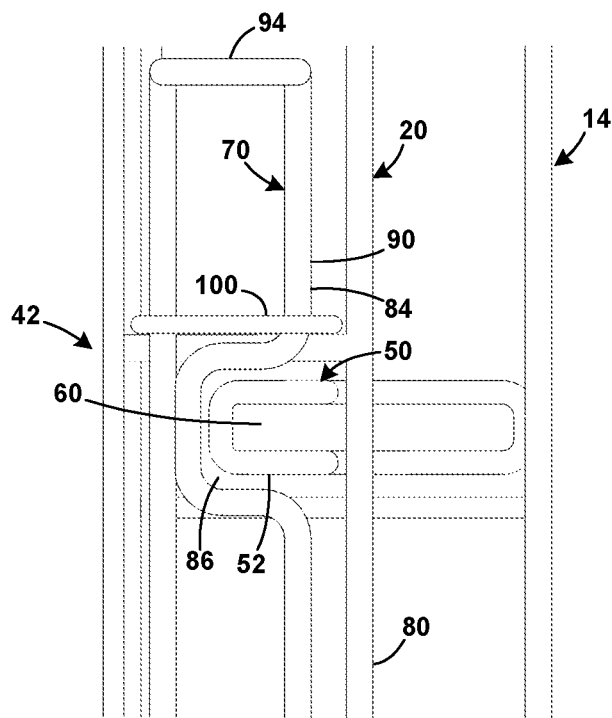
FIG. 27 is a detailed view of the configuration of FIG. 26 with the slider of FIG. 12 in the unlatched position.
Figure 28:
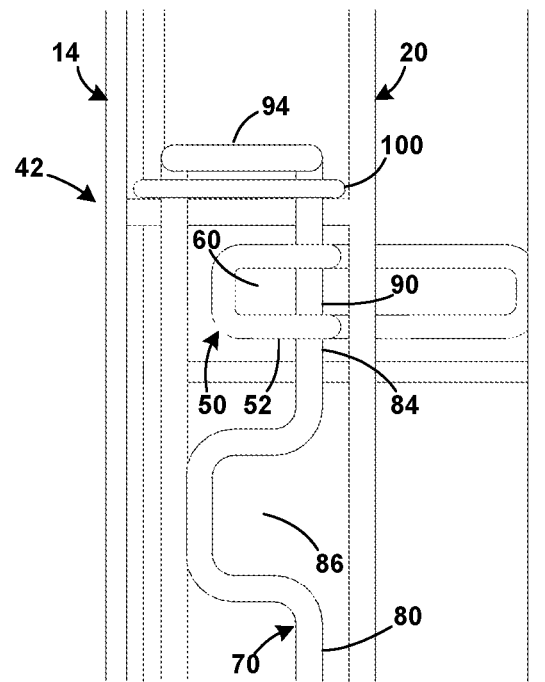
FIG. 28 is a detailed view of the configuration of FIG. 26 with the slider of FIG. 12 in the latched position.

A latch configuration with three inward-facing horizontal slots 60 is shown in FIGS. 26-28. The slider 70 needs a slot edge 90 for each slot 60 and a tab space 86 below the slot edge 90 with a height 87 that is at least the width 56 of the tab wall 52, as explained below. For this latch configuration, the parallel edges 84 of the slider 70 operate as the slot edges 90. Each of the configurations of the slider 70 of FIGS. 11-14 has a parallel edge 84 and a tab space 86 below the parallel edge 84 with a height 87 that is at least the width 56 of the tab wall 52.

Figure 11:
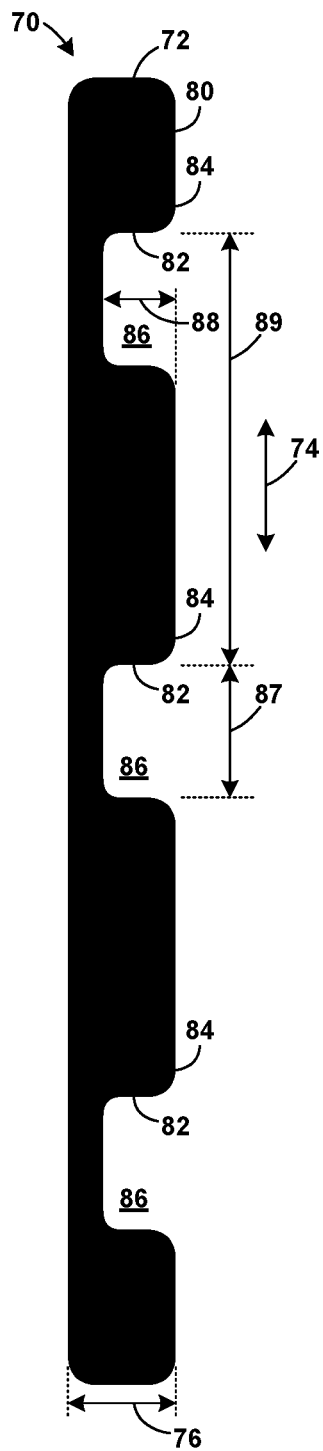
FIG. 11 is a front view of one configuration of the slider.

FIGS. 27 and 28 show how that latch 42 operates with the slider of FIG. 11 or 12. With the door 20 open, the slider 70 is installed by holding it above the upper strap 100 and sliding it downwardly into the straps 100, 102. The upper finger 94 prevents the slider 70 from falling through the upper strap 100 when the door 20 is open.

To latch the door, when the door 20 is in the open position, the slider 70 is lifted up until the parallel edge 84 is higher than the slot 60 and the tab 50 is aligned with the tab space 86 below the parallel edge 84, as in FIG. 27. Optionally, the upper finger 94 can be made large enough to be grasped for pulling the slider 70 up. Optionally, as described above, the lower finger 98 can be used to limit upward movement of the slider 70.

As the door 20 is pivoted to the closed position, the parallel edge 84 moves over the slot 60 and the tab 50 fits through the tab space 86 below the parallel edge 84. In order for the parallel edge 84 to move over the slot 60, the height 87 of the tab space 86 below the parallel edge 84 must be at least the width 59 of the tab wall 52 so that there is no interference from the slider 70.

When the door 20 is in the closed position, the slider 70 is released or lowered. Gravity causes the slider 70 to drop until reaching the latch stop 91, which occurs when the upper finger 94 rests on the upper strap 100, as in FIG. 28, thereby preventing the slider 70 from dropping further. At this point, the parallel edge 84 is located transversely in the slot 60, thereby engaging the latch 42, as in FIG. 28.

When the latch 42 is engaged and an attempt is made to open the door 20, the parallel edges 84, which are located transversely in the slots 60, will hit against the slot walls 52, thereby preventing the door 20 from opening.

In order to open the door 20, the slider 70 is lifted until the tab 50 is aligned with the tab space 86 below the parallel edge 84. As the door 20 is pulled open, the parallel edge 84 moves over the slot 60 and the tab 50 fits through the tab space 86.

Figure 29:
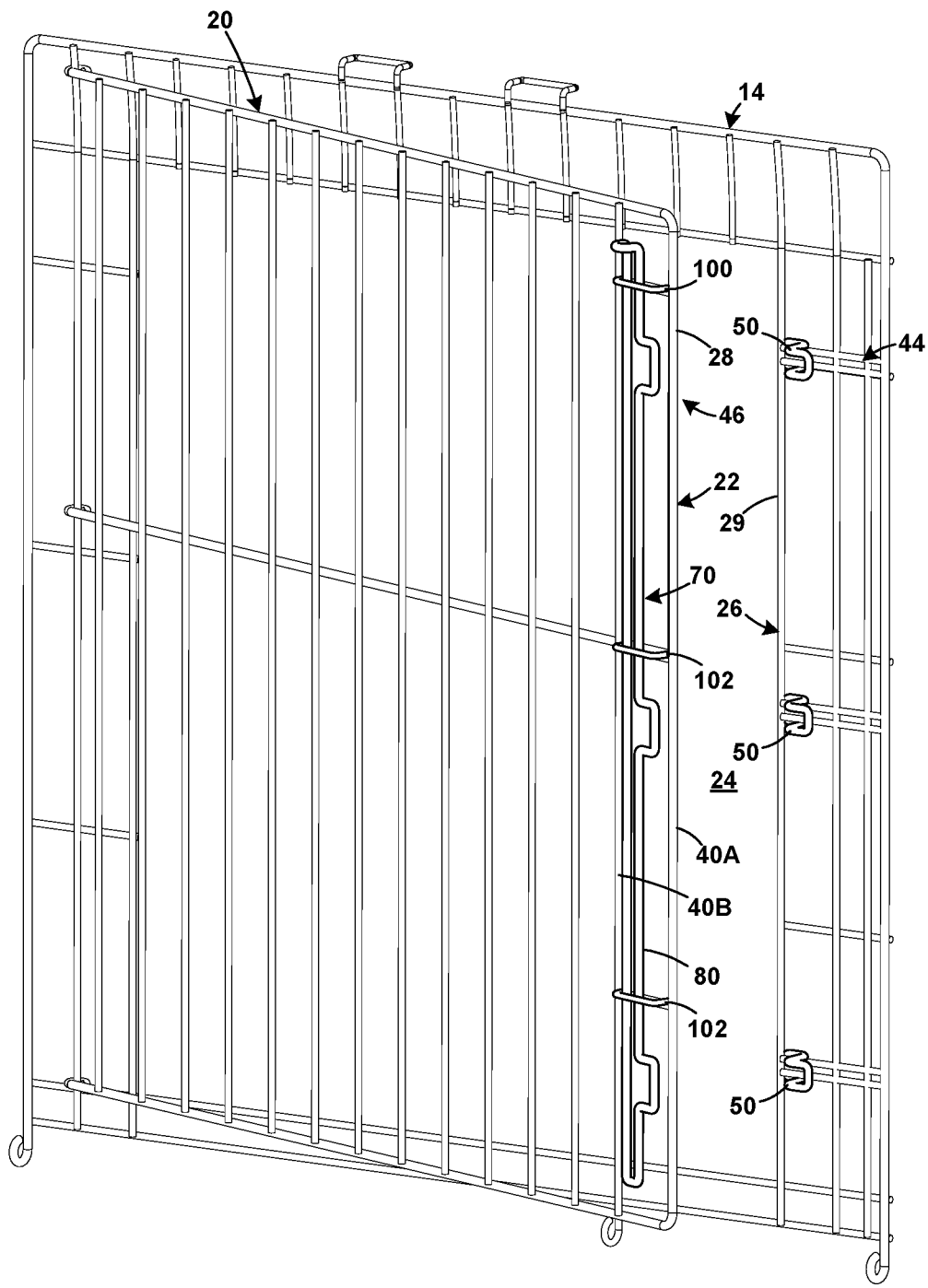
FIG. 29 is a perspective view of a side of the crate showing a configuration of the door embodiment with outward slots.
Figure 30:
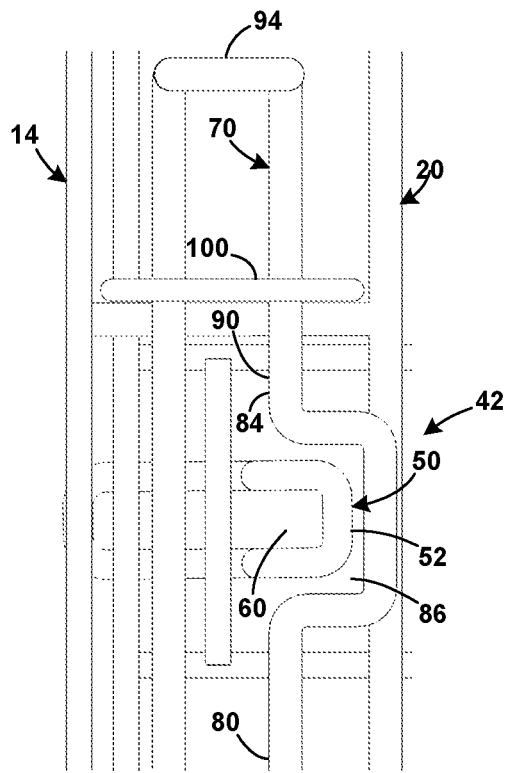
FIG. 30 is a detailed view of the configuration of FIG. 29 with the slider of FIG. 15 in the unlatched position.
Figure 31:
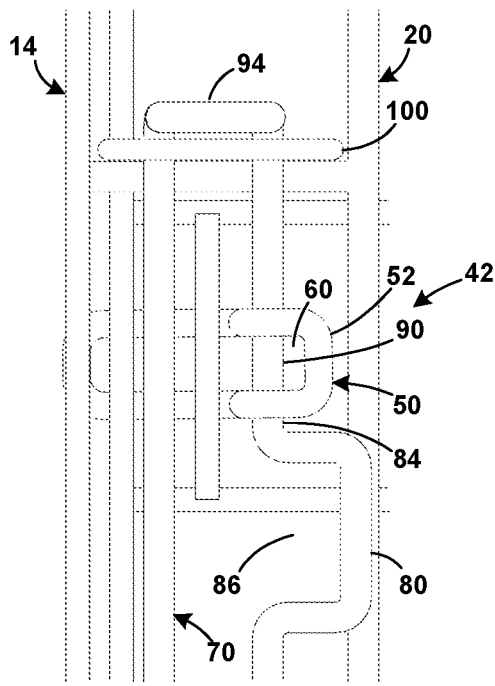
FIG. 31 is a detailed view of the configuration of FIG. 29 with the slider of FIG. 15 in the latched position.

A latch configuration with three outward-facing horizontal slots 60 is shown in FIGS. 29-31. The slider 70 needs a slot edge 90 for each slot 60 and a tab space 86 below the slot edge 90 with a width 88 that is at least the length 54 and width 56, respectively, of the tab wall 52, as explained below. The configuration of the slider 70 of FIG. 15 has a parallel edge 84 and a tab space 86 below the parallel edge 84 with a width 88 and height 87 that is at least the length 54 and width 56, respectively, of the tab wall 52.

FIGS. 30 and 31 show how that latch 42 operates with the slider of FIG. 15. With the door 20 open, the slider 70 is installed by holding it above the upper strap 100 and sliding it downwardly into the straps 100, 102. The upper finger 94 prevents the slider 70 from falling through the upper strap 100 when the door 20 is open.

To latch the door, when the door 20 is in the open position, the slider 70 is lifted up until the parallel edge 84 is higher than the slot 60 and the tab 50 is aligned with the tab space 86 below the parallel edge 84, as in FIG. 30. Optionally, the upper finger 94 can be made large enough to be grasped for pulling the slider 70 up. Optionally, as described above, the lower finger 98 can be used to limit upward movement of the slider 70.

As the door 20 is pivoted to the closed position, the parallel edge 84 moves over the slot 60 and the tab 50 fits through the tab space 86 below the parallel edge 84. In order for the parallel edge 84 to move over the slot 60, the width 88 and height 87 of the tab space 86 below the parallel edge 84 must be at least the length 56 and width 59, respectively, of the tab wall 52 so that there is no interference from the slider 70.

When the door 20 is in the closed position, the slider 70 is released or lowered. Gravity causes the slider 70 to drop until reaching the latch stop 91, which occurs when the upper finger 94 rests on the upper strap 100, as in FIG. 31, thereby preventing the slider 70 from dropping further. At this point, the parallel edge 84 is located transversely in the slot 60, thereby engaging the latch 42.

When the latch 42 is engaged and an attempt is made to open the door 20, the parallel edges 84, which are located transversely in the slots 60, will hit against the slot walls 52, thereby preventing the door 20 from opening.

In order to open the door 20, the slider 70 is lifted until the tab 50 is aligned with the tab space 86 below the parallel edge 84. As the door 20 is pulled open, the parallel edge 84 moves over the slot 60 and the tab 50 fits through the tab space 86.

In general terms for the door embodiment, the latch 42 has an unengaged position such that, when the door 20 in the open position, the slider 70 is raised until that the slot edges 90 are higher than the associated tabs 50 and the tabs 50 are aligned with the associated tab spaces 86. Depending on the particular latch configuration, the slot edges 90 are either the perpendicular edges 82 or the parallel edges 84 of the slider 70. The latch 42 has a transitional position such that, as the door 20 is pivoted to the closed position, the slot edges 90 move over the associated tabs 50 and the tabs 50 fits through the associated tab spaces 86. The latch 42 has an engaged position such that, when the door 20 is in the closed position, the slider 70 is lowered until the slot edge 90 is within the slot 60 in the transverse direction 61. This occurs when downward motion of the slider 70 is halted by the latch stop 91. Depending on the particular latch configuration, the latch stop 91 is either the perpendicular edges 82 contacting the closed end 63 of the slot or the upper finger 94 of the slider 70 contacting the upper strap 100.

Figure 32:
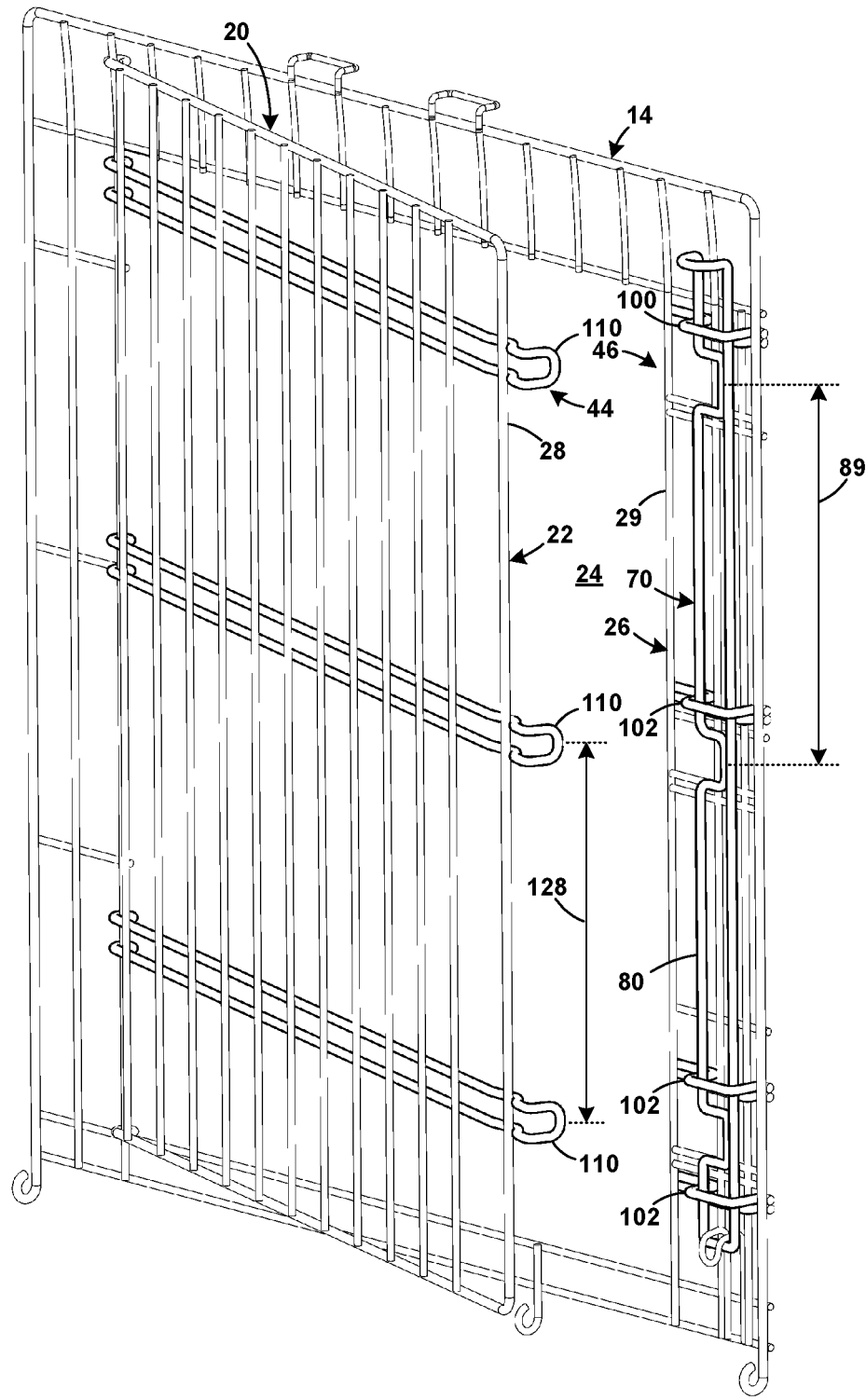
FIG. 32 is a perspective view of a side of the crate showing the panel embodiment of the latch of the present invention.
Figure 33:
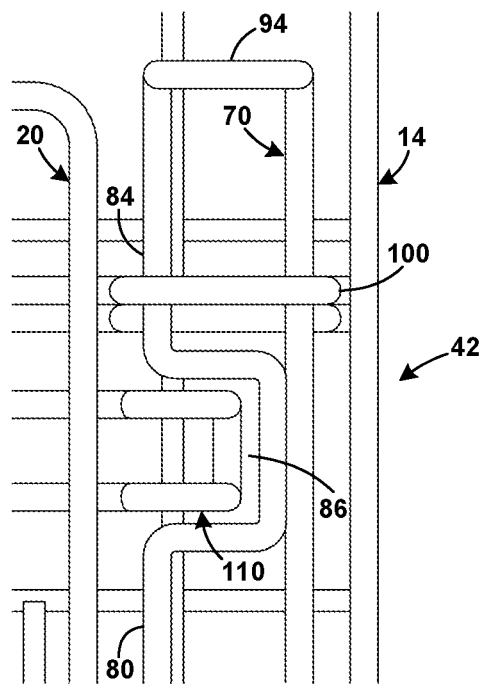
FIG. 33 is a detailed view of the configuration of FIG. 32 in the unlatched position.
Figure 34:
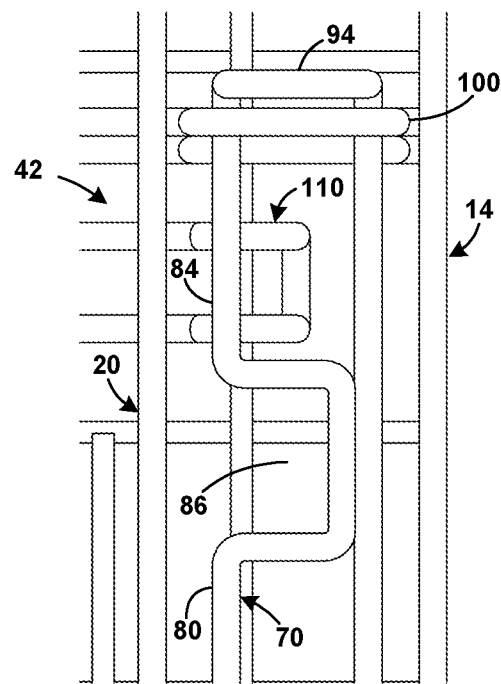
FIG. 34 is a detailed view of the configuration of FIG. 32 in the latched position.

In the panel embodiment of the latch 42, shown in FIGS. 32-34, the fixed component 44 is composed of one or more tabs 110 extending 90° inwardly from the edge of the door 20. The tabs 110 can be formed from any material and in any manner.

Figure 35:
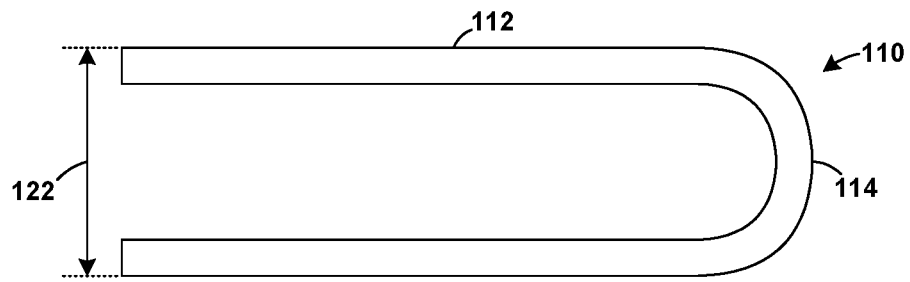
FIG. 35 is an elevational view showing the first step in forming a tab for the panel embodiment.
Figure 36:
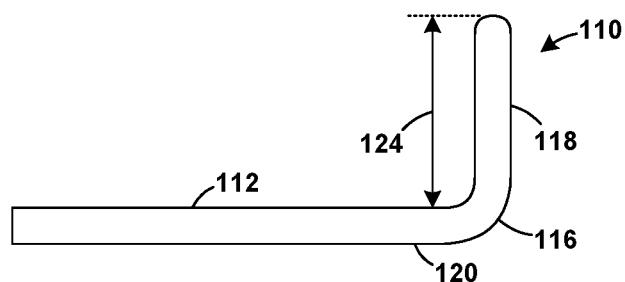
FIG. 36 is a side view showing the second step in forming a tab for the panel embodiment.

In one, the tab 110 is formed by first bending a section of rod 112 into a U shape, as at 114 in FIG. 35, with a height 122. The rod 112 is then bent approximately 90° to the plane of the U bend 114, as at 116 in FIG. 36. After the 90° bend, the tab 110 has a base 120 and a finger 118 with a depth 126. Alternatively, the section of rod 112 can be the ends of two parallel rods of the door 20, as in FIG. 32.

Alternatively, the tab 110 can be formed from materials other than a wire rod. For example, the tab 110 can be composed of a rigid plastic or carbon composite that is cut, stamped, or injected molded. In another example, the tab 110 can be composed of a metal that is cut or stamped and then bent, or cast.

The tab 110 is attached to the door 20 horizontally with the finger 118 pointing toward the opening 24. Typically, the tab 110 is welded to door rods 40, but any method of attachment that securely affixes the tab 110 to the door 20 can be employed.

The movable component 46 is the same slider 70 shown in FIGS. 11 and 12. It is attached vertically to the panel 14 with the long side 80 parallel to the edge 29 of the opening 24 opposite the hinges 30. The slider 70 is attached such at it does not overhang the edge 29 of the opening 24. Typically, the slider 70 will be attached such that it is between vertical rods 18 at or near the edge 29 of the opening 24, as in FIG. 32. The slider 70 is attached with the same straps 100, 102 described above with an exception described below.

The slider 70 needs a parallel edge 84 for each tab 110 and a tab space 86 below the parallel edge 84 that is at least the height 122 of the tab 110, as explained below. The spacing 89 between parallel edges 84 is the same as the spacing 128 between the centers of the tabs 110.

The latch 42 of the panel embodiment operates by lifting the slider 70 up until the tab spaces 86 below the parallel edges 84 are aligned with the tabs 110, as in FIG. 33. When the tab spaces 86 and tabs 110 are aligned, the door 20 can be closed because the tabs 110 fit through the tab spaces 86. In order for the tabs 110 to fit through the tab spaces 86, the height 87 of the tab space 86 must be at least the height 122 of the tab 110.

Once the door is closed, the slider 70 is released or lowered. Gravity causes the slider 70 to drop to the latch stop 91, when the upper finger 94 hits the upper strap 100, preventing the slider 70 from dropping further, as in FIG. 34. The straps 100, 102 must have a depth 106 that permits the slider 70 and tab rod 112 to fit. Consequently, the strap depth 106 is at least the sum of the thickness 78 of the slider 70 and the diameter of the tab rod 112.

When the slider 70 drops, the tab spaces 86 are no longer aligned with the tabs 110 and the latch 42 is engaged, as in FIG. 34. When the latch 42 is engaged and an attempt is made to open the door 20, the tab bases 120 hit against the parallel edge 84, thereby preventing the door 20 from opening.

In order to open the door, the slider 70 is lifted until the tabs 110 align with the tab spaces 86. As the door 20 is pulled opened, the tabs 110 fit through the tab spaces 86.

Thus it has been shown and described a pet crate latch. Since certain changes may be made in the present disclosure without departing from the scope of the present invention, it is intended that all matter described in the foregoing specification and shown in the accompanying drawings be interpreted as illustrative and not in a limiting sense.

What is claimed is:

1. An animal crate comprising:
   (a) a plurality of side panels, at least one side panel being formed by a plurality of vertical and horizontal wire rods, an opening in the at least one side panel for passage to and from an interior of the crate;
   (b) a door with a perimeter edge pivotally attached to the at least one side panel and movable between an open position where passage through the opening by an animal is allowed and a closed position where passage through the opening by the animal is prevented;
   (c) a latch for retaining the door in the closed position, the latch comprising:
   (d) at least one L-shaped tab with a base and a wall, the base attached to the panel adjacent to the opening such that the tab and panel form a slot, the slot being parallel to the panel, the slot having an open end, opposed open sides, a closed end, and a transverse direction extending between the open sides;
   (e) a generally rectangular slider mounted to the door to reciprocate vertically and adjacent to the door perimeter edge, the slider having an upper end, at least one slot edge extending in the slot transverse direction, and a tab space below the at least one slot edge, the tab space being sized to permit the tab to pass through;
   (f) the latch having an unengaged position wherein, when the door in the open position, the slider is raised such that the tab is aligned with the tab space;
   (g) the latch having a transitional position wherein, as the door is pivoted to the closed position, the tab fits through the tab space; and
   (h) the latch having an engaged position wherein, when the door is in the closed position, the slider is lowered to a latch stop where the slot edge is within the slot in the transverse direction.

2. The animal crate of claim 1 wherein the slot is vertical with the open end of the slot up and the slot edge is a perpendicular edge on the slider.

3. The animal crate of claim 2 wherein the latch stop is the slot edge resting on the closed end of the slot.

4. The animal crate of claim 1 wherein the slot is horizontal and the slot edge is a parallel edge on the slider.

5. The animal crate of claim 4 wherein the slider reciprocates vertically through an upper strap and at least one other strap, the slider includes an upper finger that is generally horizontal at the upper end of the slider, and the latch stop is the upper finger resting on the upper strap.

6. The animal crate of claim 4 wherein the open end of the slot is toward the opening.

7. The animal crate of claim 4 wherein the open end of the slot is away from the opening.

8. The animal crate of claim 1 wherein the slider reciprocates vertically through an upper strap and at least one other strap.

9. The animal crate of claim 8 wherein the slider includes an upper finger at the upper end of the slider that is generally horizontal.

10. The animal crate of claim 1 wherein the slider is a bent wire rod.

11. The animal crate of claim 1 wherein the tab is a bent wire rod.

12. An animal crate comprising:
    (a) a plurality of side panels, at least one side panel being formed by a plurality of vertical and horizontal wire rods, an opening in the at least one side panel for passage to and from an interior of the crate;
    (b) a door with a perimeter edge pivotally attached to the at least one side panel and movable between an open position where passage through the opening by an animal is allowed and a closed position where passage through the opening by the animal is prevented;
    (c) a latch for retaining the door in the closed position, the latch comprising:
    (d) at least one L-shaped, bent wire rod tab with a base and a wall, the base attached to the panel adjacent to the opening such that the tab and panel form a slot, the slot being parallel to the panel, the slot having an open end, opposed open sides, a closed end, and a transverse direction extending between the open sides;
    (e) a generally rectangular, wire rod slider mounted to the door adjacent to the door perimeter edge and to reciprocate vertically through an upper strap and at least one other strap, the slider having an upper end, at least one slot edge extending in the slot transverse direction, and a tab space below the at least one slot edge, the tab space being sized to permit the tab to pass through, the slider including an upper finger at the upper end of the slider that is generally horizontal;
    (f) the latch having an unengaged position wherein, when the door in the open position, the slider is raised such that the tab is aligned with the tab space;
    (g) the latch having a transitional position wherein, as the door is pivoted to the closed position, the tab fits through the tab space; and
    (h) the latch having an engaged position wherein, when the door is in the closed position, the slider is lowered to a latch stop where the slot edge is within the slot in the transverse direction.

13. The animal crate of claim 12 wherein the slot is vertical with the open end of the slot up and the slot edge is a perpendicular edge on the slider.

14. The animal crate of claim 13 wherein the latch stop is the slot edge resting on the closed end of the slot.

15. The animal crate of claim 12 wherein the slot is horizontal, the slot edge is a parallel edge on the slider, and the latch stop is the upper finger resting on the upper strap.

16. The animal crate of claim 15 wherein the open end of the slot is toward the opening.

17. The animal crate of claim 15 wherein the open end of the slot is away from the opening.

* * * * *